Patented June 30, 1936

2,046,128

UNITED STATES PATENT OFFICE 2,046,128

METHOD OF TREATING SULPHUR AND PRODUCT

Raymond C. McQuiston, West Newton, Mass., assignor to Mac Sulphur Corporation, New York, N. Y., a corporation of Delaware No Drawing. Application December 17, 1932, Serial No. 647,833

8 Claims. (Cl. 167—20)

The present invention relates to a new fungicidal, insecticidal and ovicidal composition and the method of preparing the same. More specifically the present invention relates to a product, and the process of preparing the same, which contains sulphur, and which product is obtained in the form of a rather thick emulsified cream which may be mixed with water to form a more dilute emulsion and in this form sprayed on the foliage and leaves of plants. The present composition is made without the use of a colloid mill. The fungicide, insecticide and ovicide is made in a preferred process which consists of three principal parts, as will more fully appear subsequently. The composition prepared according to the present process is one which is practically neutral in its chemical reaction, and consequently it will not burn up or otherwise injure the leaves or other portions of a plant to which it is applied.

The present composition is further characterized by the fact that it may be mixed and incorporated with other substances having a toxic value. For example, it may be mixed with copper colloids and compounds, chromates, arsenical compounds, fluorides and silico fluorides, phenolic substances, pyridine paradichlorobenzene, naphthalene, nicotine, pyrethrum, Paris green, Bordeaux mixture, petroleum products, and other substances.

As stated previously, the preferred process of preparing the present composition may be divided into three parts. In the first part of the present process, sulphur, preferably monoclinic or rhombic, is dissolved in carbon bisulphide or other suitable sulphur solvent in a container. In a separate container, an emulsifying solution containing fatty acids, a substantially anhydrous alcoholic body, potassium or sodium hydroxide are first mixed and after saponification, water is added. The carbon bisulphide solution described above is slowly added to this emulsifying base liquor. The mixture is continuously stirred during the addition of the carbon bisulphide solution. The pH of this mixture should be regulated so that it is between 7.4 and 7.6. The third part of the process calls for the preparation of what I term "a greased buffer". The purpose of the greased buffer is to absorb the carbon bisulphide vapors, to effect an hydrophobic condition and neutralization. As a result of the aforementioned absorption of $CS_2$ vapors, the inflammability of the composition is diminished. The greased buffer contains a protein such as animal glue and casein and also contains starch, trisodium phosphate, oleic acid, cold water and formaldehyde. In preparing this "greased buffer" the glue, casein, starch and the phosphate were first soaked in cold water with constant stirring until absorption was complete, and then the mass was heated to 180–190° F. This temperature was held constant while agitation of the mass was continued and until the solid ingredients were completely dissolved or dispersed. After complete dissolution, the oleic acid and formaldehyde were slowly added while constantly stirring. This greased buffer is preferably prepared in a kettle provided with heating means, such as an internal heating coil or thermal jacket, and a motor driven agitator or stirring device. After such incorporation, the solution is slowly stirred into the sulphur and carbon bisulphide emulsion mixture described above. The mass should be stirred for ten to twenty minutes to complete the incorporation of all the ingredients of the mass and to bring about a hydrogen ion concentration 7.0 to 6.8.

The general nature and purpose of the present invention have been outlined generically above, and the invention will now be described more specifically, particularly with regard to the proportions of the various ingredients employed.

First, with regard to the solution of sulphur in a solvent, it is pointed out that carbon bisulphide is the preferred solvent, and I prefer to dissolve 100 parts of sulphur in 400 parts of carbon bisulphide. This process of dissolving in the carbon bisulphide in the above proportions is carried out at room temperature. If, however, the carbon bisulphide is heated to 100° F., it is possible to dissolve 100 parts of sulphur in 250 parts of carbon bisulphide. At room temperature, sulphur would separate out, but by adding the "greased buffer" hereafter described, separation of sulphur from $CS_2$ is prevented. Other examples of sulphur solvents and the proportion of solvent and solute are:—

100 parts by weight of sulphur.
200 parts by weight of sulphur chloride at 100° F., or
100 parts by weight sulphur
600 parts by weight of naphthalene at 180° F., or
100 parts by weight of sulphur
1000 parts by weight of toluol at 160° F., or
100 parts by weight of sulphur
1600 parts by weight of trichlorethylene at 130° F.

The following specific examples of the emulsifying base are given below:—

*Example I*

14 parts by weight of cocoanut fatty acids.
14 parts by weight of oleic acid.
2 parts by weight of stearic acid.
13 parts by weight of substantially anhydrous alcohol.
7 parts by weight of potassium hydroxide.
After ten or fifteen minutes add 150 parts by weight of cold water.

Example II 100 parts by weight of cocoanut fatty acid.
100 parts by weight of oleic acid.
15 parts by weight of stearic acid.
90 parts by weight of anhydrous ethyl alcohol.
50 parts by weight of potassium hydroxide or sodium hydroxide.

Example III 100 parts of weight of cocoanut fatty acids.
100 parts by weight of oleic acid.
15 parts by weight of stearic acid.
90 parts by weight of anhydrous ethyl alcohol.
50 parts by weight of ammonium hydroxide.

Example IV 100 parts by weight of cocoanut fatty acids.
100 parts by weight of oleic acid.
15 parts by weight of stearic acid.
50 parts by weight of triethanolamine.

It will of course be understood that the above formulæ do not restrict the base emulsifier to the quantities and ingredients stated. Any other oil or fatty acid or glyceride may be used, also any other alkali-soluble alcohol, ether or tincture may likewise be used.

In the foregoing examples, the fatty acid, alcohol and alkali metal hydroxide are first mixed in the absence of water whereupon the corresponding soap is formed in known manner. Water is then added. In Examples II, III, and IV, it will be noted that the amount of water added has not been specified. The amount of water should be about three times the weight of the combined ingredients specified in the above examples. Other proportions of water, however, may be used, depending on the consistency of the emulsion desired.

Finally, part of the present process consists as indicated previously, in the preparation of a greased buffer. The following specific examples of the ingredients and the amounts thereof used are given below.

Example I 2 parts by weight of animal glue.
1 part by weight of casein.
1 part by weight of starch.
¼ part by weight of trisodium phosphate.
12 parts by weight of oleic acid.
16 parts by weight of cold water.
¼ part by weight of formaldehyde (40% solution).

Example II 2 parts by weight of animal glue.
1 part by weight of casein.
1 part by weight of potato or other starch.
¼ part by weight of trisodium phosphate or other alkali.
12 parts by weight of oleic acid.
16 parts by weight of cold water.
¼ part by weight of formaldehyde.

Example III 3 parts by weight of animal glue.
1 part by weight of blood albumen or haemoglobin.
⅛ part by weight of potassium hydroxide or ammonia.
12 parts by weight of oleic acid.
16 parts by weight of cold water.
¼ part by weight of formaldehyde or chrome alum or tannic acid or bichromate.

Example IV 2 parts by weight of animal glue.
2 parts by weight of starch or dextrin.
¼ part by weight of formalin or other tanning agents.
12 parts by weight of oleic acid or red oil.
16 parts by weight of cold water.

Example V 2 parts by weight of animal glue.
1 part by weight of casein or blood albumen.
1 part by weight of starch or dextrin.
¼ part by weight of alkali metal hydroxide.
¼ part by weight of formaldehyde.
12 parts by weight of palmitic or other oil or fat acid; or a glyceride such as castor oil or cocoanut oil.
16 parts by weight of cold water.

The product prepared according to the present invention in its final form is a cream of heavy consistency, and is adapted to be diluted with water to give a colloidal solution which may be conveniently sprayed on shrubs, trees and plants, and applied as animal dip. It will be noted that the final product contains carbon bisulphide and sulphur, together with tincture soaps. It is quite probable that there is a chemical reaction between the various ingredients which have been enumerated and described above and the cream or concentrated emulsion contains thiocarbonates, xanthogenates and related products.

In another modification of my process, I omit the "greased buffer". It is within the scope of the invention to prepare as a separate article of manufacture and sale a potentially emulsifiable concentrate. This may readily be done in the manner hereinbefore described, that is to say by first dissolving sulphur in carbon bisulphide, or another suitable solvent. There is then separately prepared a saponified oleaginous material which I have termed "emulsified base". As already explained, this may be done by admixing a fatty acid, or other oleaginous material with an alkali tincture, such for example as an alcoholic potash or an ether solution of an alkali metal, or triethanolamine. The carbon bisulphide solution of sulphur is added to the special emulsifying agent under the conditions stated heretofore as to temperature, slow admixture and constant agitation. This material may readily be made up and shipped from the point of manufacture to the point of use and at the latter point, or at any intermediate point, may be made up as an emulsion merely by mixing the requisite quantity of water and agitating. It will thus be seen that this product differs from the preferred modification in that the greased buffer is omitted. The composition will therefore consist of a mixture of the sulphur containing solvent and the emulsifying solution or base. Both of these have been fully described heretofore as to composition and method of compounding.

I claim:—

1. Process of preparing a toxic composition which comprises dissolving sulphur in a suitable solvent and mixing it with an emulsifying base containing fatty acids, alcoholic body and an alkaline metal hydroxide, and then adding a greased buffer containing a protein, an alkaline metal hydroxide and a tanning agent, and stirring the mass.

2. Process of preparing a toxic composition comprising dissolving sulphur in carbon bisulphide, adding the carbon bisulphide solution of sulphur to an emulsifying base containing saponified fatty acids and an alcoholic body, adding water, adding a greased buffer containing a tanned protein and stirring the mass.

3. Process of preparing a toxic composition comprising dissolving sulphur in about four times its weight of carbon bisulphide and adding this solution to an emulsifying base containing saponified higher fatty acids and an alcoholic body, adding water, adding a greased buffer containing animal glue, casein, alkaline metal hydroxide and formaldehyde, and stirring the mass.

4. A toxic composition comprising sulphur, a sulphur solvent, saponified higher fatty acids, an alcoholic body, protein, formaldehyde and water.

5. A toxic composition comprising sulphur, carbon bisulphide, alkaline metal salts of higher fatty acids, alcohol, the reaction product of a protein and formaldehyde and water.

6. A toxic composition containing sulphur, carbon bisulphide in an amount by weight which is approximately four times the weight of sulphur, sodium salts of higher fatty acids, alcohol, and the reaction product of a protein and formaldehyde and water.

7. A toxic composition comprising sulphur dissolved in a sulphur solvent and subsequently dispersed in aqueous emulsion, in which are incorporated potentially tanning agents.

8. A toxic composition comprising sulphur dissolved in a sulphur solvent sequentially emulsified or peptized with saponified materials in solution form, in which is incorporated an aqueous mixture of proteins, carbohydrates, alkalies, oleaginous and tanning substances.

RAYMOND C. McQUISTON.